US011358715B2

(12) United States Patent
Karem

(10) Patent No.: US 11,358,715 B2
(45) Date of Patent: Jun. 14, 2022

(54) DEVICES AND METHODS FOR MODIFYING WIDTH OF ROTOR AIRCRAFT DURING OPERATIONAL FLIGHT

(71) Applicant: Abe Karem, Tustin, CA (US)

(72) Inventor: Abe Karem, Tustin, CA (US)

( * ) Notice: Subject to any disclaimer, the term of this patent is extended or adjusted under 35 U.S.C. 154(b) by 563 days.

(21) Appl. No.: 16/200,874

(22) Filed: Nov. 27, 2018

(65) Prior Publication Data

US 2020/0023961 A1 Jan. 23, 2020

Related U.S. Application Data

(60) Provisional application No. 62/591,625, filed on Nov. 28, 2017.

(51) Int. Cl.
*B64C 29/00* (2006.01)
*B64C 3/40* (2006.01)

(52) U.S. Cl.
CPC ............ *B64C 29/0033* (2013.01); *B64C 3/40* (2013.01)

(58) Field of Classification Search
CPC ......... B64C 29/0033; B64C 3/40; B64C 3/56; B64C 27/08; B64C 3/00; B64C 39/003; B64C 39/006; Y02T 50/10
See application file for complete search history.

(56) References Cited

U.S. PATENT DOCUMENTS

| | | | | |
|---|---|---|---|---|
| 1,775,861 A | * | 9/1930 | Lehberger | B64C 29/0033 244/7 R |
| 2,382,824 A | * | 8/1945 | Solomon | B64C 29/0033 244/7 C |
| 2,448,392 A | * | 8/1948 | Quady | B64C 29/0033 244/7 R |
| 2,479,125 A | * | 8/1949 | Leonard | B64C 29/0075 244/7 B |
| 2,708,081 A | * | 5/1955 | Dobson | B64C 29/0033 244/7 C |
| 2,814,451 A | * | 11/1957 | Turner | B64C 29/0033 244/7 R |
| 3,035,789 A | * | 5/1962 | Young | B64C 29/0033 244/7 C |
| 3,107,881 A | * | 10/1963 | Stuart, III | B64C 29/0033 244/7 C |
| 3,116,040 A | * | 12/1963 | Petrides | B64C 27/18 244/17.13 |
| 3,185,408 A | * | 5/1965 | Higgins | B64C 29/0033 244/7 R |
| 3,259,343 A | * | 7/1966 | Roppel | B64C 29/0091 244/53 R |
| 3,404,852 A | * | 10/1968 | Sambell | B64C 29/0033 244/7 A |

(Continued)

FOREIGN PATENT DOCUMENTS

| | | |
|---|---|---|
| KR | 10-2009-0054027 | 5/2009 |
| WO | 2008003455 | 1/2008 |

*Primary Examiner* — Medhat Badawi

(74) *Attorney, Agent, or Firm* — Fish IP Law, LLP

(57) ABSTRACT

Devices, systems, and methods are provided in which a wing of a tiltrotor aircraft is rotated during operational flight, for example from a position perpendicular to the aircraft's fuselage through an angle of 30° or more in the direction of flight. This effectively narrows the maximum width of the aircraft, and facilitates maneuvering through closely spaced obstacles.

12 Claims, 4 Drawing Sheets

Flight Direction

(56) References Cited

U.S. PATENT DOCUMENTS

| | | | |
|---|---|---|---|
| 3,514,052 A * | 5/1970 | McKeown | B64C 29/0033 244/12.3 |
| 3,592,412 A * | 7/1971 | Glatfelter | B64C 29/0033 244/7 A |
| 3,666,209 A * | 5/1972 | Taylor | B64C 29/0033 244/7 C |
| 3,971,535 A * | 7/1976 | Jones | B64C 3/40 244/46 |
| 4,132,374 A * | 1/1979 | Abell | B64C 3/40 244/46 |
| 4,142,697 A * | 3/1979 | Fradenburgh | B64C 11/003 244/7 R |
| 4,691,878 A * | 9/1987 | Vaughan | B64C 3/56 244/49 |
| 4,998,689 A * | 3/1991 | Woodcock | B64C 3/40 244/46 |
| 5,085,315 A * | 2/1992 | Sambell | B64C 27/30 244/17.25 |
| 5,096,140 A * | 3/1992 | Dornier, Jr | B64C 29/0033 244/12.4 |
| 5,337,974 A * | 8/1994 | Rumberger | B64C 3/40 244/39 |
| 6,367,736 B1 * | 4/2002 | Pancotti | B64C 29/0033 244/48 |
| 6,601,795 B1 * | 8/2003 | Chen | B64C 3/40 244/46 |
| 6,607,161 B1 * | 8/2003 | Krysinski | B64C 9/00 244/7 A |
| 6,669,137 B1 * | 12/2003 | Chen | B64C 27/24 244/7 R |
| 7,143,973 B2 * | 12/2006 | Ballew | B64C 27/10 244/6 |
| 7,861,967 B2 * | 1/2011 | Karem | B64C 29/0033 244/12.4 |
| 8,070,090 B2 * | 12/2011 | Tayman | B64C 39/024 244/7 C |
| 8,292,216 B1 * | 10/2012 | Rumberger, Jr. | B64F 5/50 244/39 |
| 8,864,062 B2 * | 10/2014 | Karem | B64C 11/26 244/12.4 |
| 9,045,226 B2 * | 6/2015 | Piasecki | B64C 27/32 |
| 9,126,678 B2 * | 9/2015 | Ross | B64C 29/0033 |
| 9,376,206 B2 * | 6/2016 | Ross | B64C 29/0033 |
| 9,663,225 B1 * | 5/2017 | Kooiman | B64F 5/40 |
| 9,856,029 B2 * | 1/2018 | King | F16C 29/002 |
| 9,868,541 B2 * | 1/2018 | Kooiman | B64C 27/22 |
| 9,868,542 B2 * | 1/2018 | Williams | B64C 27/26 |
| 9,878,788 B2 * | 1/2018 | Blue | B64C 37/00 |
| 10,065,736 B2 * | 9/2018 | Foskey | B64C 5/10 |
| 10,077,106 B2 * | 9/2018 | Foskey | B64C 11/28 |
| 10,086,936 B2 * | 10/2018 | Foskey | B64C 3/56 |
| 10,167,080 B2 * | 1/2019 | Foskey | B64C 11/28 |
| 10,196,127 B2 * | 2/2019 | Kooiman | B64C 11/28 |
| 10,220,936 B2 * | 3/2019 | Kooiman | B64C 29/0033 |
| 10,301,016 B1 * | 5/2019 | Bondarev | B64C 29/0033 |
| 10,343,762 B2 * | 7/2019 | Ross | B64C 5/02 |
| 10,414,483 B2 * | 9/2019 | Ivans | B64C 3/56 |
| 10,703,461 B2 * | 7/2020 | Cravener | B64C 3/56 |
| 10,815,008 B2 * | 10/2020 | Ross | B64C 1/00 |
| 2004/0118969 A1 * | 6/2004 | MacCready | B64D 27/24 244/5 |
| 2009/0224096 A1 * | 9/2009 | Waide | B64D 31/12 244/60 |
| 2009/0224098 A1 * | 9/2009 | Karem | B64C 25/02 244/87 |
| 2009/0256026 A1 * | 10/2009 | Karem | B64C 27/08 244/99.2 |
| 2009/0266941 A1 * | 10/2009 | Karem | B64C 3/185 244/7 A |
| 2009/0266942 A1 * | 10/2009 | Karem | B64C 29/0033 244/7 C |
| 2009/0269200 A1 * | 10/2009 | Karem | B64C 29/0033 416/148 |
| 2010/0072325 A1 * | 3/2010 | Sambell | B64C 27/50 244/7 A |
| 2010/0150719 A1 * | 6/2010 | Waide | B64C 27/68 416/147 |
| 2010/0171001 A1 * | 7/2010 | Karem | B64D 1/08 244/7 R |
| 2010/0193644 A1 * | 8/2010 | Karem | B64C 27/28 244/7 R |
| 2010/0213309 A1 * | 8/2010 | Parks | B64C 3/16 244/46 |
| 2010/0270435 A1 * | 10/2010 | Karem | B64C 29/0033 244/7 R |
| 2010/0276549 A1 * | 11/2010 | Karem | B64C 29/0033 244/7 A |
| 2011/0024552 A1 * | 2/2011 | Patt | B64C 27/463 244/6 |
| 2011/0042510 A1 * | 2/2011 | Bevirt | B64C 29/0033 244/12.4 |
| 2011/0315806 A1 * | 12/2011 | Piasecki | B64C 27/20 244/17.11 |
| 2012/0248259 A1 * | 10/2012 | Page | B64C 29/02 244/7 A |
| 2012/0280091 A1 * | 11/2012 | Saiz | B64C 27/30 244/7 R |
| 2012/0292435 A1 * | 11/2012 | Karem | B64C 1/00 244/36 |
| 2012/0292436 A1 * | 11/2012 | Karem | B64C 3/56 244/49 |
| 2013/0256465 A1 * | 10/2013 | Smith | B64C 29/0033 244/7 C |
| 2014/0061392 A1 * | 3/2014 | Karem | B64C 29/0033 244/7 R |
| 2014/0271204 A1 * | 9/2014 | Shundo | B64C 27/605 416/148 |
| 2016/0311545 A1 * | 10/2016 | Parks | B64D 27/24 |
| 2016/0368590 A1 * | 12/2016 | Karem | B64C 11/28 |
| 2017/0057630 A1 * | 3/2017 | Schwaiger | B64D 27/04 |
| 2017/0096221 A1 * | 4/2017 | Piasecki | B64C 29/00 |
| 2017/0283052 A1 * | 10/2017 | Moshe | B64C 29/0033 |
| 2018/0057160 A1 * | 3/2018 | Robertson | B64C 11/006 |
| 2018/0079485 A1 * | 3/2018 | Kooiman | B64C 27/50 |
| 2018/0079486 A1 * | 3/2018 | Kooiman | B64C 27/50 |
| 2018/0079499 A1 * | 3/2018 | Foskey | B64C 3/56 |
| 2018/0079501 A1 * | 3/2018 | Foskey | B64C 29/0033 |
| 2018/0079502 A1 * | 3/2018 | Foskey | B64C 11/28 |
| 2018/0273168 A1 * | 9/2018 | Page | B64C 27/22 |
| 2019/0322365 A1 * | 10/2019 | Gaffney | B64C 39/024 |

\* cited by examiner

Flight Direction

Flight Direction

Flight Direction

DEVICES AND METHODS FOR MODIFYING WIDTH OF ROTOR AIRCRAFT DURING OPERATIONAL FLIGHT

This application claims the benefit of U.S. Provisional Application No. 62/591,625, filed on Nov. 28, 2017. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is rotorcraft, in particular tilt rotor aircraft.

BACKGROUND

The background description includes information that may be useful in understanding the present invention. It is not an admission that any of the information provided herein is prior art or relevant to the presently claimed invention, or that any publication specifically or implicitly referenced is prior art.

Tiltrotor aircraft such as the V-22 offer some of the speed and cruise efficiencies of fixed wing aircraft with the Vertical Take-Off and Landing (VTOL) with the hover capabilities of helicopters. Typically such aircraft are configured with a wing mounted perpendicular to the aircraft's fuselage, with tilting rotors mounted on the wing. In some configurations the wing sections on which the rotors are mounted are tilted; in other configurations the nacelle containing the rotor is rotated while the wing remains in an essentially fixed horizontal position. The need to provide sufficient clearance between the rotors and the fuselage means that such aircraft tend to be approximately twice as wide as a single rotor helicopter with the same lift capability. This limits the capacity of tiltrotor aircraft to fly in a narrow path between closely spaced obstacles. The US military has recent and upcoming major rotorcraft programs requiring the ability to operate in constrained urban environments including city streets, and in some cases these needs are embodied by inflight dimensions limits of no more than 40 feet wide and 60 feet long.

Military versions of tiltrotor aircraft often need to have the capacity for folding in order to fit in compact storage areas (for example, on an aircraft carrier). Such folding, as in the V-22, includes swiveling the wing to fit over the fuselage for storage, with the flight mode restricted to the wing being locked in a single position of symmetry, reasonably perpendicular to the fuselage and to the direction of flight.

Aircraft having pivoting wings have been proposed. For example, International Patent Application Publication No. WO 2008/003455 (to Valenzuela) describes a rotorcraft equipped with a wing that can transition between straight and swept-wing configurations through rotation of individual wing segments on each side of the aircraft. Aircraft in which a wing is rotated as a unit relative to the fuselage have also been explored. For example U.S. Pat. No. 6,601,795 (to Chen) describes an air vehicle having a pair of wings, each of which can be rotated about a central point independently relative to the air vehicle body. This is rotation is used to optimize flight efficiency. Aircraft in which the entire wing can be pivoted up to 60° about a central point on the aircraft fuselage, such as the NASA AD-1 have been tested in order to achieve reduced drag (and hence fuel consumption) at high speeds. The rotation of the wing in such aircraft, however, results in reduced lift at low speeds. As such low speed flight, as is typical when maneuvering between closely spaced obstacles, is not supported by the pivoted position of the wing in such aircraft.

United States Patent Application No. 2017/0057630 (to Schwaiger) describes an aircraft with a number of pivoting rotors mounted on the aircraft's fuselage. Wings of the aircraft can be rotated to lie along the fuselage of the aircraft. Such a design moves engines and mechanisms for power transmission to the rotors into central portions of the aircraft normally utilized for cargo and storage, severely limiting the operational utility of such designs.

Thus there is a need for systems, methods and apparatus that allow a tiltrotor aircraft to negotiate narrow spaces while in flight.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

Systems, devices, and methods of the inventive concept provide for rotation of a rotor-bearing wing of a tiltrotor aircraft during operational flight including before take-off. While it is understood that tiltrotor provide for high speed flight beyond the speeds of helicopters (typically limited to 200 knots), the current invention with the wing horizontally rotated per the current invention, the aircraft will be limited to a speed typical of modern helicopters. Such rotation can pivot the wing from a conventional position (perpendicular to the aircraft's fuselage) to an angle 30° or more relative to the conventional position, reducing the width of the aircraft. Pivoting can be accomplished by rotating a unitary wing about a central rotating mount on the aircraft's fuselage, or by movement of wing segments coupled to such a mount and moved to effectively provide a unitary wing. In preferred embodiments the rotors of the tiltrotor aircraft are oriented so as to provide vertical thrust or lift when the wing is angled in this manner. The reduced width of the aircraft facilitates maneuvering of tiltrotor aircraft through closely spaced obstacles.

One embodiment of the inventive concept is a rotorcraft that includes a first rotor mounted on first portion of the rotorcraft's wing and a second rotor mounted on a second portion of the wing, where the first and second portions of the wing are coupled to a rotating mechanism positioned to rotate the first and second wing portions between a first position and a second position. Such an aircraft can include a control system that is configured to utilize the rotating mechanism to rotate the wing between the first and second positions during operational flight. The second position can be angled at least 30°, 45°, or 60° from the first position in the then-current direction of flight. In some embodiments, when the wing is in the first position it is substantially perpendicular to the long dimension of the fuselage and/or the then-current direction of flight, and has a maximum flight width in this configuration. Moving the wing from the first position to the second position reduces the flight width by at least 25%, 40%, or 50. In some embodiments the wing has a maximum flight width of more than 80 feet when the wing is in the first position, and a flight width of less than 65 feet or 40 feet when the wing is in the second position. The rotorcraft's rotors can be mounted on the outboard ends or termini of the wing, which can be a unitary wing (in which the wing segments are portions of a single structure) or have separate wing segments that act in concert (e.g. one segment on each side of the aircraft). Rotation is accomplished using a rotating mechanism, such as a turntable, which can be coupled centrally to a unitary wing or serve as a joining points for the separate segments of the wing.

Another embodiment of the inventive concept is a method for modifying a tiltrotor aircraft that has a wing having one or more rotors by coupling the wing to a rotating mechanism mounted on the aircraft's fuselage and providing a controller that rotates the wing using the rotating mechanism during operational flight. This rotation displaces the wing at least 30°, 45°, or 60° between a first position and a second position in the then-current direction of flight. In some embodiments the wing is perpendicular to the then-current direction of flight when in the first position.

Another embodiment of the inventive concept is a method of operating a tiltrotor aircraft, by rotating a wing of the tiltrotor aircraft during operational flight using a rotating mechanism that displaces the wing at least 30°, 45°, or 60° between a first position to a second position in the then-current direction of flight, where the wing includes one or more rotors. In some embodiments the wing is perpendicular to the then-current direction of flight when in the first position. In the same or different embodiments, such displacement of the wing can occur before take-off and/or after landing.

DESCRIPTION OF THE FIGURES

FIG. 1A provides a top-down view of an embodiment of a tiltrotor aircraft of the inventive concept with the wing positioned approximately perpendicular to the fuselage of the aircraft, presenting a maximum wing aspect ratio, where the rotors are positioned at the ends of the wing. FIG. 1B provides a top-down view of a tiltrotor aircraft of FIG. 1A with the wing pivoted about a central point relative to the fuselage of the aircraft, presenting a minimized wing aspect ratio without reducing the distance between the rotors.

DETAILED DESCRIPTION

Figure 1A:
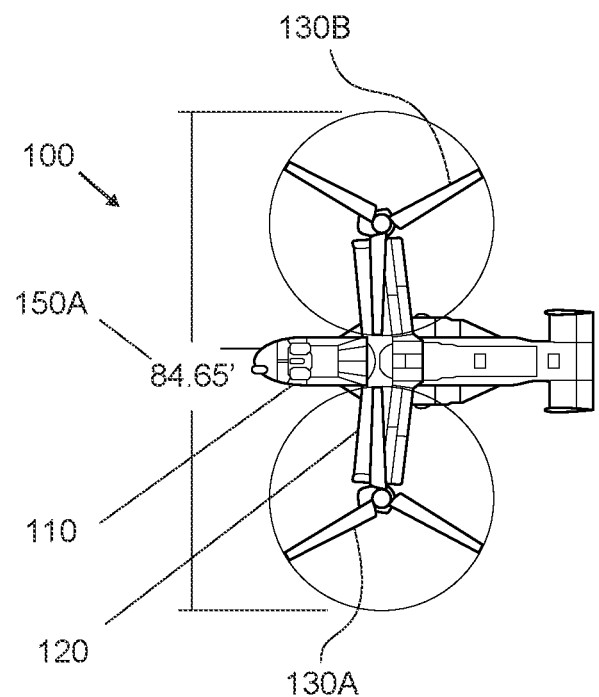
FIGS. 1A and 1B.

The following description includes information that may be useful in understanding the present invention. It is not an admission that any of the information provided herein is prior art or relevant to the presently claimed invention, or that any publication specifically or implicitly referenced is prior art.

The inventive subject matter provides apparatus, systems and methods in which a rotorcraft has first and second rotors mounted on a wing, and a control system is configured to allow the wing to rotate horizontally during operational flight. Such a wing can be a single element wing, mounted to the tiltrotor aircraft's fuselage at a central point by a rotating or pivoting mechanism. Unlike the pivoting mechanism of the V-22 which is used for folding and takes loads only in high surface wind (on ship) and in taxi, the inventive pivoting mechanism will take flight loads and provide the required stiffness for safe flight dynamics. Alternatively, the inventive subject matter can include independent wing elements joined at one terminus to a central element mounted on the fuselage of a tiltrotor aircraft. The wing elements can support tiltable rotors, and such wing elements can be moved in concert to effectively provide a pivoting wing. Such pivoting wings can be rotated at least 45°, at least 60°, or more than 60° relative to the long axis of the tiltrotor aircraft's fuselage.

Various objects, features, aspects and advantages of the inventive subject matter will become more apparent from the following detailed description of preferred embodiments, along with the accompanying drawing figures in which like numerals represent like components.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, a rotorcraft or tiltrotor aircraft of the inventive concept can include first and second rotors mounted on left and right portions of a wing, respectively. The wing can be mounted on a turntable configured to horizontally rotate the wing relative to the aircraft's fuselage. A control system can be configured to utilize the turntable to horizontally rotate the wing during operational flight at angles of at least 45°, at least 60°, or more than 60° relative to the long axis of the fuselage. In some embodiments the wing portion and the associated rotor are rotated together. In other embodiments a nacelle that includes the rotor can be rotated while the wing portion or a segment of the wing portion remains horizontal.

In other embodiments, a rotorcraft or tiltrotor aircraft of the inventive concept can include first and second rotors mounted on left and right wing segments, respectively. Such left and right wing segments are discontinuous, but can move in concert to effectively act as a unitary wing structure. One end of each wing segment can be coupled to a turntable or other rotating structure (such as a rotatable column or shaft) configured to horizontally rotate each wing segment relative to the aircraft's fuselage. A control system can be configured to utilize the turntable to horizontally rotate the wing segments during operational flight so as to provide a continuous wing structure oriented at angles of at least 45°, at least 60°, or more than 60° relative to the long axis of the fuselage. In some embodiments the wing portion and the associated rotor are rotated together. In other embodiments a nacelle that includes the rotor can be rotated while the wing portion or a segment of the wing portion remains horizontal. In another embodiment the control system can be configured to horizontally rotate the wing while simultaneously tilting the rotors.

As noted above, such control systems are preferably configured to horizontally rotate the wing, during operational flight, at least 30° from a first position to a second position, more preferably up to at least 45° from the first position to the second position, and most preferably up to at least 60° from the first position to the second position. In such embodiments the second position provides the tilt rotor aircraft with a reduced wing aspect ratio relative to the first position without altering the distance between the rotors. As such an aircraft so equipped can maintain rotor lift at low operational speeds for maneuvering through closely spaced obstacles that would not be accessible to similar aircraft having fixed wings mounted perpendicular to the fuselage.

Figure 1B:
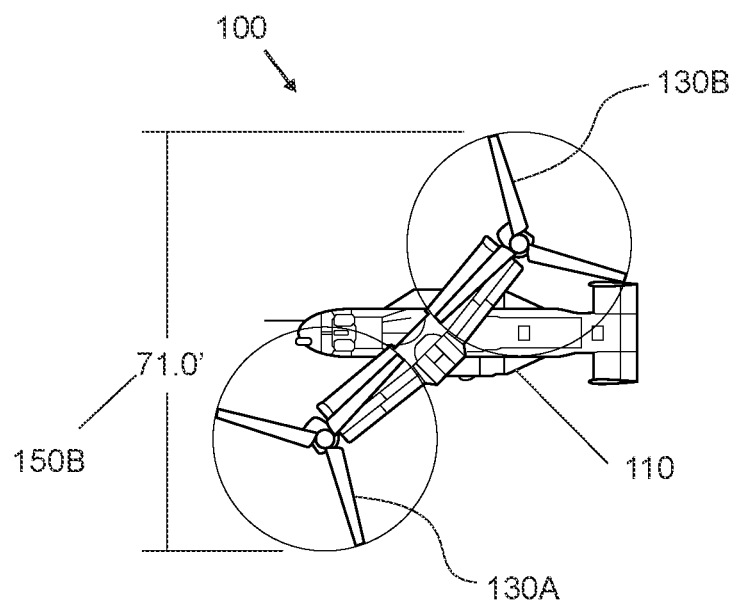

An example of an embodiment of a tiltrotor aircraft of the inventive concept is shown in FIGS. 1A and 1B, which depict an exemplary V-22 Osprey rotorcraft 100 modified to provide rotation of the aircraft's wing (along with its terminally mounted rotors). FIG. 1A shows such an aircraft in the first position, which provides maximum wing aspect ratio. FIG. 2B shows such an aircraft in the second position, which provides a reduced or minimized wing aspect ratio. As shown, such an aircraft 100 has a fuselage 110, and left and right rotors 130A, 130B mounted on the ends of a horizontally rotating wing 120. The wing 120 is mounted on a turntable 140, which rotates the wing 120 relative to the fuselage. When the wing 120 is in a first position (shown in FIG. 1A), substantially perpendicular to a long dimension of the fuselage, the flight width 150A of the aircraft 100 is at a maximum (in this example, approximately 84.6 feet). When the wing 120 is in a second position (shown in FIG. 1B) that is pivoted 45° from the first position, the flight width 150B of the aircraft 100 is reduced to approximately 71.0 feet. depict a contemplated aircraft in a three dimensional surface presentation. As shown in the figures, the nacelles of rotors of rotorcraft can be positioned at the outboard ends of the wing. However, it is also contemplated that there could be additional wing outboard of the nacelles.

Although not explicitly shown in the figures, it should be appreciated that in aircraft of the inventive concept the wing 120 of rotorcraft 100 can be further rotated horizontally to at least 60° off from the first position, in which case the flight width 150B of the aircraft 100 is reduced to about 61.3 feet. Such extreme reduction is considered to be viable for helicopter mode of a modified V-22 aircraft, with nacelle tilt angle deviations of 75° to 105°.

In more generalized cases, a rotorcraft according to the inventive concept can include a control system configured to allow the wing to be angled about 30°, about 45°, about 60° or more than about 60° relative to the first position. In preferred embodiments the control system allows the wing to be angled at least 60° from the first position. Accordingly, it is contemplated that tilt-rotorcraft are contemplated as having a flight width no more that 85%, 75%, 70%, 65%. 60%, 55%, 50%, or less than 50% of the maximum flight width when the wing is rotated.

Figure 2A:
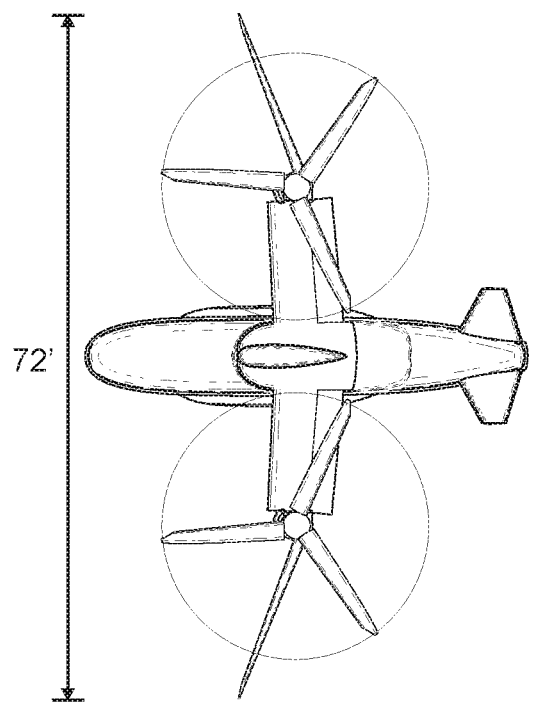
FIGS. 2A and 2B provide top down and frontal views of another tiltrotor aircraft as contemplated herein.
Figure 2B:
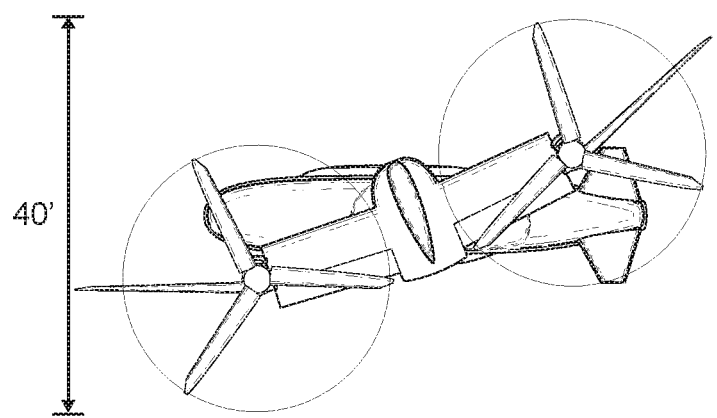

FIGS. 2A and 2B provide top down and frontal views of another tiltrotor aircraft as contemplated herein.

Figure 3A:
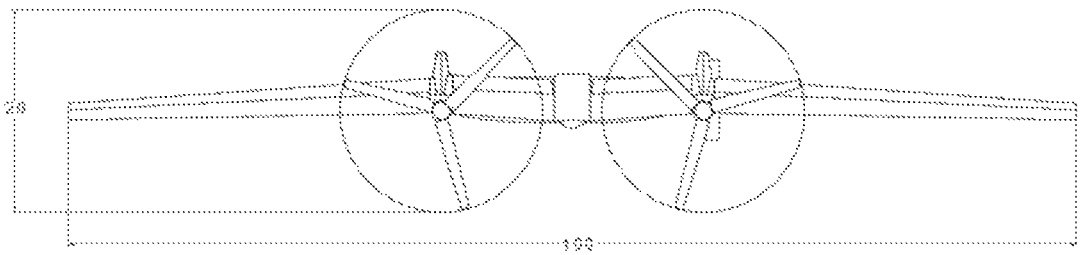
FIGS. 3A, 3B, 3C, and 3D provide frontal and perspective views of an embodiment of an unmanned tiltrotor aircraft as contemplated herein.
Figure 3B:
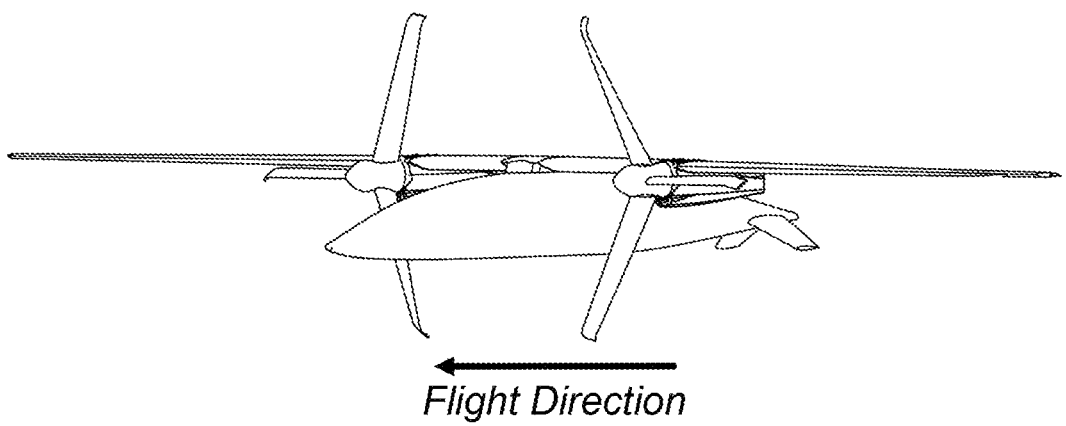
Figure 3C:
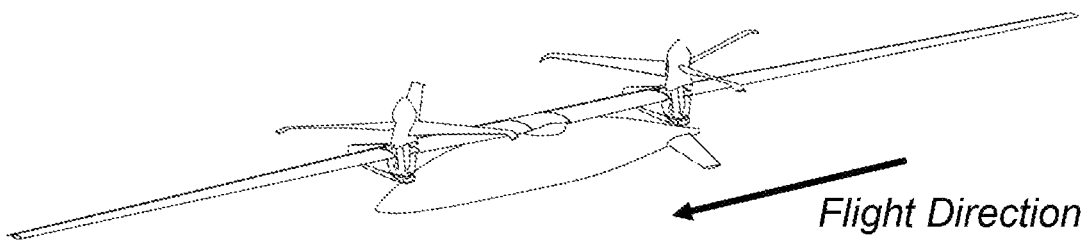
Figure 3D:
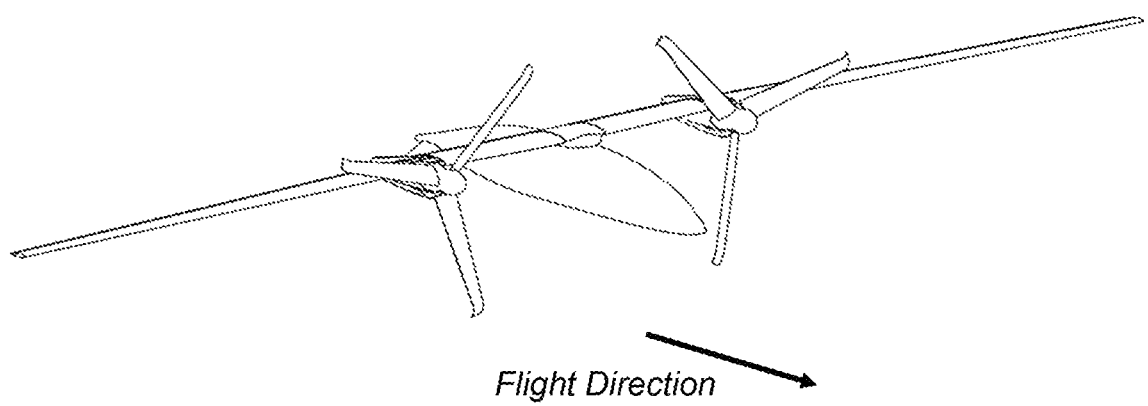

FIGS. 3A, 3B, 3C, and 3D: FIG. 3A provides a top-down view of an embodiment of an unmanned tiltrotor aircraft of the inventive concept with the wing positioned approximately parallel to the fuselage of the aircraft, presenting a minimum wing aspect ratio, where the rotors are positioned inboard of the wing tip. FIG. 3B provides an isometric view of an unmanned tiltrotor aircraft of FIG. 3A with the wing positioned approximately perpendicular to the fuselage of the aircraft. FIG. 3C provides an isometric view of an unmanned tiltrotor aircraft of FIG. 3A with the wing positioned approximately parallel to the fuselage of the aircraft. FIG. 3D provides an isometric view of an alternative embodiment to the aircraft of FIG. 3B.

As can be seen in FIGS. 3C and 3D, 15, the first and second wing segments can extend beyond tips of the first and second rotors, respectively, and can even extend beyond fore and aft ends of the fuselage, respectively.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A rotorcraft having a direction of flight when the rotorcraft is in flight, comprising:
   a fuselage;
   a turntable mounted on the fuselage,
   a wing mounted on the turntable such that the wing is configured to rotate at least 30° away from away from vertical to the fuselage axis in a top view;
   a first nacelle with a first tiltrotor mounted on a left side of the wing, and a second nacelle with a second tiltrotor mounted on a right side of the wing;
   wherein each of the first and second nacelles are tiltable during flight between forward and vertical flight positions;
   wherein each of the first and second nacelles extend downward from the wing when the rotorcraft is in the vertical flight position; and
   wherein a top of the fuselage is tapered at the front and the rear of the fuselage to accommodate the first and second nacelles positioned over the fuselage.

2. The rotorcraft of claim 1, wherein when the rotorcraft has a longitudinal axis, and the wing is rotatable on the turntable to a position substantially parallel to the longitudinal axis during flight.

3. The rotorcraft of claim 1, wherein the wing is rotatable on the turntable during flight by at least 30° during flight.

4. The rotorcraft of claim 1, wherein the wing is rotatable on the turntable during flight by at least 45° during flight.

5. The rotorcraft of claim 1, wherein the wing is rotatable on the turntable during flight by 60° during flight.

6. The rotorcraft of claim 1, wherein the wing has a span of at least 80 feet.

7. The rotorcraft of claim 1, wherein the left and right tiltrotors have rotor blades that extend laterally beyond left and right tips of the left and right sides of the wing, respectively.

8. A method of operating an aircraft having a fuselage, a wing coupled to the fuselage, and left and right tiltrotors positioned on the wing, the method comprising:
   operating the aircraft with the left and right tiltrotors in forward flight mode; and
   while operating the aircraft, tilting the left and right tiltrotors to a vertical flight mode; and rotating the wing such that the left and right tiltrotors are at least partially positioned over the fuselage.

9. The method of claim 8, wherein the wing is rotated such that a line between the left and right tiltrotors is parallel to a longitudinal axis of the aircraft.

10. The rotorcraft of claim 1, wherein each of the first and second nacelles extend downward from the wing when the rotorcraft is in the vertical flight position, the rotorcraft has a longitudinal axis, and the wing is rotatable on the turntable to a position substantially parallel to the longitudinal axis during flight.

11. The rotorcraft of claim 1, wherein a top of the fuselage is tapered at the front and the rear of the fuselage to accommodate the first and second nacelles positioned over the fuselage.

12. The rotorcraft of claim 11, wherein when the rotorcraft has a longitudinal axis, and the wing is rotatable on the turntable to a position substantially parallel to the longitudinal axis during flight.

* * * * *